Jan. 30, 1934.  W. P. WEZEL  1,945,247
METHOD OF AND MEANS FOR REMOVING THE SKIN FROM CATTLE AND THE LIKE
Filed Dec. 4, 1931  2 Sheets-Sheet 1
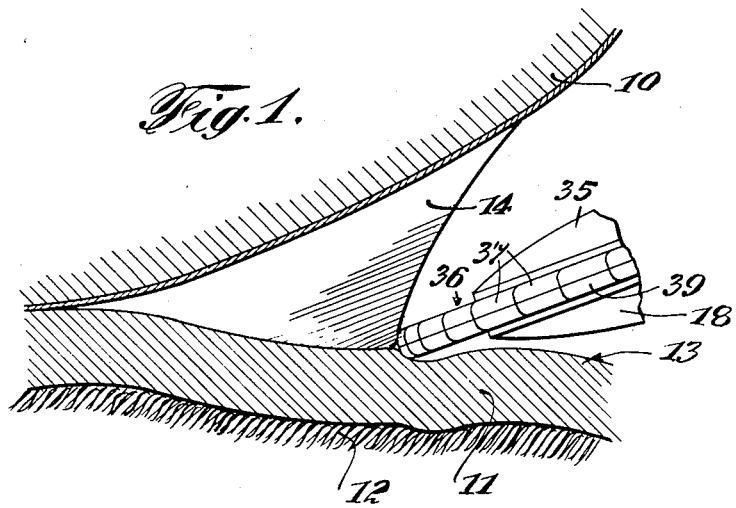
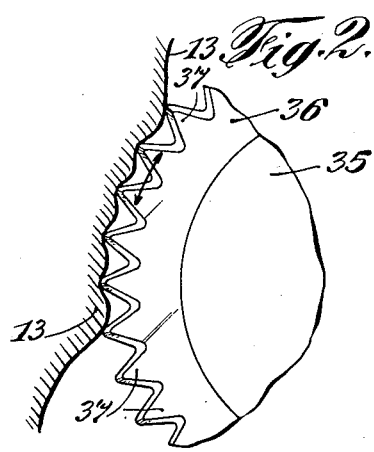
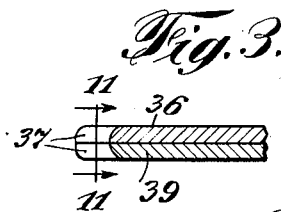
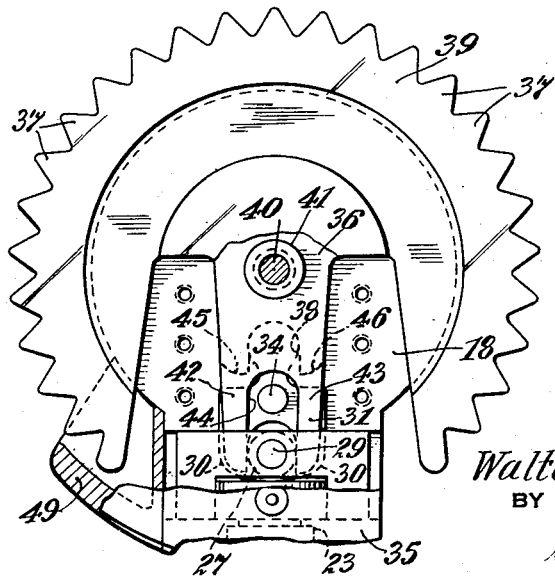
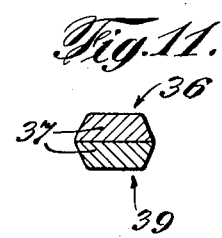
INVENTOR
Walter Paul Wezel
BY C. P. Goepel
his ATTORNEY Jan. 30, 1934.   W. P. WEZEL   1,945,247
METHOD OF AND MEANS FOR REMOVING THE SKIN FROM CATTLE AND THE LIKE
Filed Dec. 4, 1931   2 Sheets-Sheet 2
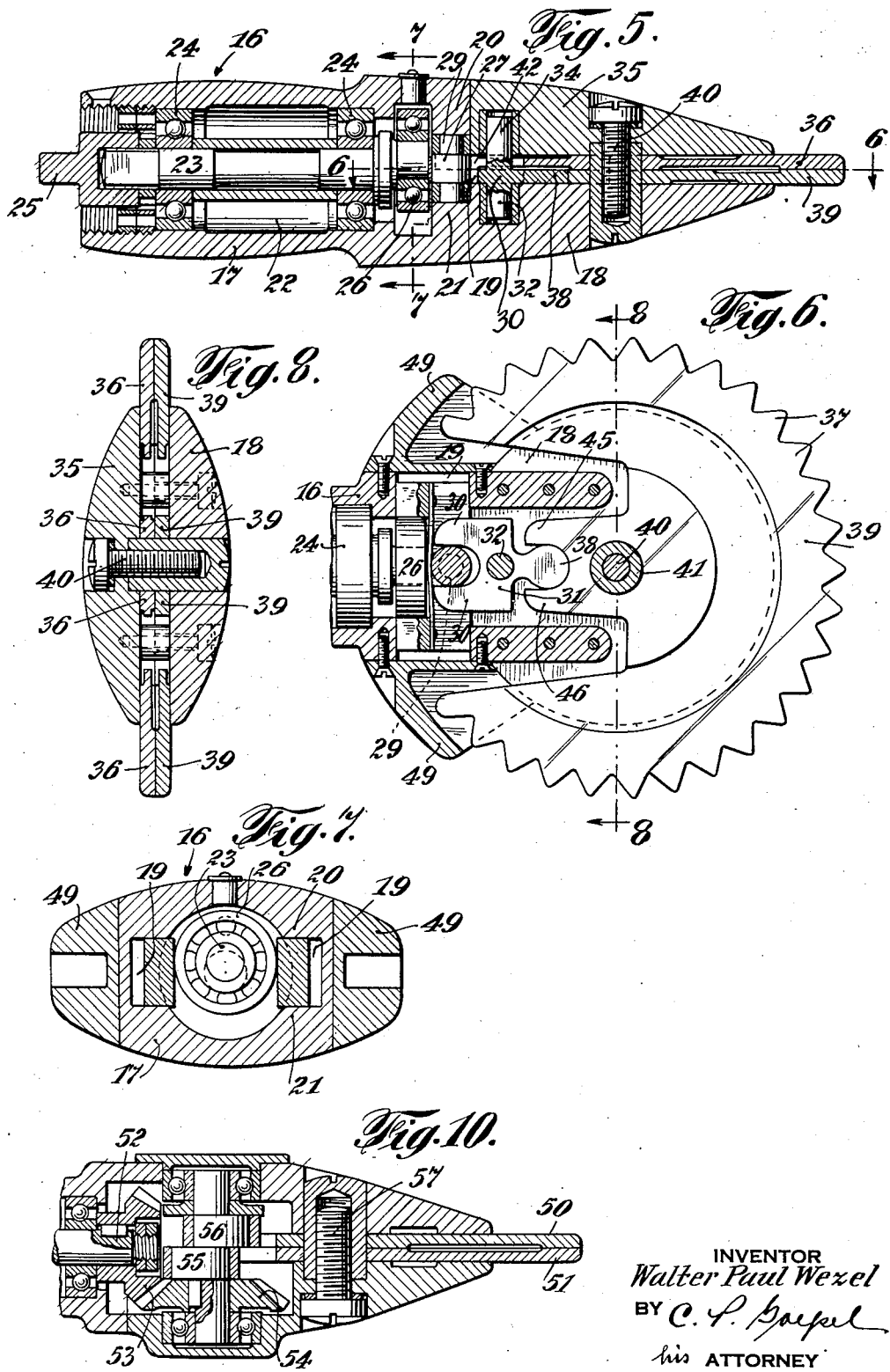
INVENTOR
Walter Paul Wezel
BY C. P. Goepel
his ATTORNEY Patented Jan. 30, 1934

1,945,247

UNITED STATES PATENT OFFICE 1,945,247

METHOD OF AND MEANS FOR REMOVING THE SKIN FROM CATTLE AND THE LIKE

Walter Paul Wezel, Maulbronn, Germany, assignor to Chas. L. Jarvis Company, Inc., Gildersleeve, Conn., a corporation of Connecticut Application December 4, 1931. Serial No. 578,853

3 Claims. (Cl. 17—22)

This invention relates to a method of and means for removing the skin from the meat of cattle, such as oxen. Between the meat or muscular tissue proper and skin or pell there is a layer of connective tissue, which adheres about equally to the subcutaneous layer of the skin and the outer part of the muscular tissue of the meat. Heretofore, when an ox was skinned with the aid of knives or with knife-like cutting tools, the operator would at one time cut into the skin, and at another time into the muscular layer of the meat. The price of skins or hides and meat is determined by the minimum number of accidental cuts therein; those skins having the least number of cuts or tears receiving the highest prices. Also, due to the rather cumbersome handling of large sized oxen, the operators could not effectively remove the skin and would very often cause injury to themselves with their own knives.

One object of the invention is to provide a method for doing away with these disadvantageous features of the procedure heretofore followed, and also to provide safe and efficient means for the removal of the skin or hide from the meaty portion of an animal without injuring either the meat or skin, so as to enable the separating operation to be expeditiously performed to obtain the highest prices for the skin and the meat.

The invention consists in a method of removing the skin of animals, in which the connective tissue of the pell, at its point of adherence to the skin is subjected to a knocking or drumming action, or to a push and pull action, in order to loosen the skin from the connective tissue, whereby separation of the pell from the muscular tissue of the animal readily takes place during the simultaneous pulling of the skin as is usually done.

The invention also consists in the improved apparatus having two superposed plates having angular indentations or notches in the periphery thereof, the sides of which are angular and are dulled so that no scissors or knife-like action can take place. The peripheral extremities of these plates are applied to the point of adhesion of the skin or pell to the connective tissue and meat, and by the plates moving relatively to each other and through an arc a separation is effected. The juncture of the skin and meat is subjected to a combined pushing, jogging, knocking, or drumming action, whereby the connective material of the pell, or skin and meat enters the notches of the device and is driven out therefrom under a certain squeezing action, without, however, cutting the pell or skin or meat, since the sides of the notches are dull and not sharpened. These combined actions of the plates scrape and pull the skin from the connective tissue and the tissue is pushed back by the beating operation and then when separated from the skin shrinks back upon the muscular tissue or meat.

The invention will be more fully described and the preferred embodiment shown in the drawings and finally pointed out in the claims.

In the accompanying drawings:—

Figure 1 shows a side diagrammatic view of part of the tool applied in a skin removing operation;

Fig. 2 shows a fragmentary plan view of the tool as applied;

Fig. 3 is a cross section of a detail of the jagged edges of the tool showing the sharp meeting edges;

Fig. 4 is a fragmentary detail of the limited relative oscillatory movement of the plates to prevent the tissue from entering too deeply into the notches of the plate and to avoid cutting;

Fig. 5 is a longitudinal section of the tool;

Fig. 6 is a fragmentary plan view of the same on line 6—6 of Fig. 5;

Fig. 7 is a section of Fig. 5 on line 7—7 of Fig. 5;

Fig. 8 is a section on line 8—8 of Fig. 6;

Fig. 9 is a fragmentary plan view showing the connection of one of the plates with immediate actuating members, the handle being merely diagrammatically shown;

Fig. 10 is a fragmentary longitudinal section of another form; and

Fig. 11 is a section on line 11—11 of Fig. 3.

Similar character references indicate corresponding parts throughout the various views in the drawings.

Referring to the drawings and more particularly to Fig. 1, the meat 10 which includes muscular and fatty tissue such as adheres to it, is held against the hide, pell or skin 11 having the hairy or furry part thereof 12, and an interior or subcutaneous layer indicated by 13. Between the subcutaneous layer 13 and meat portion 10, there is connective tissue 14 which envelops the meat 10 and is readily distensible, and when stretched between the skin 13 and meat 10 is in a sense three-dimensional and elastic, and apparently full of air spaces. It is stretchable along its length as well as along its depth. The connective tissue is difficult to get at with a knife or knife-like tool, since a delicate cutting or separating operation is required to apply the knife edge exactly at the point of joining of the connective tissue and the pell, skin, or tissue and meat, and in consequence the skin or meat is accidentally cut. The number of cuts reduce the value of the meat or skin. In the case of meat, the cut generally is transversely or angularly of the muscular bundles of tissues, whereas in the case of the skin or hide any cut reduces the value of the same for use in making a good grade of leather.

The tool is applied immediately at the point where the skin or pell adheres to the connective tissue, and by the action thereof the skin is readily separated from the tissue, and the stretched tissue falls back on the meat. The action is continued all around the carcass to be skinned, and as there is no sharp edge in the tool neither the skin nor the meat is cut. The combined pushing action of the operation, and the scraping, peeling, pushing back, and beating operation of the tool loosen the tissue from the skin, as a pull is exerted on the skin. The method, therefore, consists in subjecting the skin where the connective tissue is intermediate the meat and the skin to a beating action whereby the skin is peeled off under simultaneous pushing, pressure, and pulling of the skin. The tool to carry out this method may take many different forms and the method can be carried out by hand, by a beating operation at the point where the connective tissue adheres to the skin, while the tissue is drawn from the meat.

The tool embodied in this invention consists essentially of two cooperating plate members with dulled surfaces moving relatively to each other, so as to form a bite between, and in the preferred form consists of two discs of either semicircular outline or of a circular outline of greater circumference than a semicircle. These discs have notches, serrations, or jagged ends with sides inclined to the radii of the serrations or jagged ends. The discs rotate on a pivot pin common to both discs, that is, the rotation is partial, and more of a rotary reciprocation, with one disc moving in the opposite direction to the other. Consequently, the sides of the notches move angularly to each other. As these are dulled, and have an open angle, a finger for instance placed in the notches of the discs, with the discs moving, would not be cut or injured but simply squeezed out from the notched portion. This is clearly shown in Fig. 2, where the skin or pell merely partially enters the notches and is pushed or squeezed out in which there is a give and take action.

In the embodiment shown in the drawings, a holding and operating unit 16 has a hollow cylindrical handle 17 to be held by the operator of the device, and a forward or front basal portion 18. The cylindrical upper part of the handle 17 is flattened out forming a rectangular section and merges on one side into the base portion 18. The flat or rectangular section 19 is grooved, having side walls 20 and 21, the base 18 being integral with wall 21. The base is substantially circular shaped for accommodating disc-shaped members, as hereinafter described. The outer flat wall of the base 18 is drawn out to form an outline having one side or outer face tapering longitudinally for easily applying the tool in the skinning operation, while the other face is flat for accommodating a disc-like plate member hereinafter described.

The chamber 22 of the cylindrical handle 17, is provided with a rotary spindle 23 carried on roller bearings or other anti-friction means 24. The roller bearings are set within the handle and are disposed at the ends thereof for reducing the frictional resistance offered on rotation of the spindle.

The spindle 23 has at one end a drawn-out rectangular-shaped claw 25 for connection with driving means, not shown, to operate the tool. The opposite end of spindle 23 within the hollow of handle 17 contains an eccentric bearing 26 or other means for driving a crank 27 within the groove 19 and between the walls 20 and 21 of handle 17.

The crank 27 is an elongated bar and has on its base portion 38 a recess within which the eccentric bearing is movable. Upon the rotation of the eccentric bearing 26, crank 27 is moved lengthwise or reciprocated in the groove 19, but does not pass beyond the ends of walls 20 and 21. The upper part of the crank 27 contains a recess in which is a cross pin 29 for accommodating the depending tongues 30 of a connecting link plate 31. The link plate 31 has a center or pivoting pin 32 extending therethrough, one end of the pin 32 fitting into an opening in the wall of base 18, while the oppositely extending portion 34 of the pin is insertable into a complementary face piece 35 corresponding in shape with the base piece 18 and attachable onto the side wall 21.

The link plate 31 is provided with a rounded portion 38 adjacent the pin 32 for imparting oscillatory motion to a circular member 39. Beneath the pivot pin 32 of the link plate 31 depending prongs 30 make contact with the cross-pin 29. The disc members 36 and 39 are pivoted onto a pin 40 inserted into the base 18 and the complementary face piece 35. One jagged end disc member 36 has a part cut away to provide an axial central opening 41 for the entrance of the pivot center pin 40, and depending or extending prongs 42 and 43 forming a space 44 therebetween. When the disc is set against plate 31 the space between prongs 42 and 43 lies over the head 38 of link plate 31 and makes contact with the cross-pin 29 during the rotary action of spindle 23, and the crank 27 is moved back and forth causing a rocking movement of link plate 31. By such movement the pin 29 of the crank 27 makes alternate contact with each of the prongs 42 and 43 of disc 36, thus causing an oscillatory movement thereof, with pin 40 as the pivotal axis. The jagged ends or serrations 37 on the disc are blunt and form notches between each jagged end. The disc 39 when used in connection with the serrated or jagged end disc 36 in skinning animals tends to tear and pull apart the connective tissues from the skin or pell of the carcass of the animal. The sides of the jagged ends 37 of the disc incline gradually from the inner to the outer working face and are rounded to prevent cutting of the tissues or meat.

The other jagged end disc 39 is of the same construction as disc 36, except that the prongs 45 and 46 are shorter than the prongs of the disc 36 and are engaged by the round head 38 of plate 31. Every time the crank is moved back and forth in groove 19, the disc is moved in an oscillatory manner with respect to the other disc. By this construction it will be noted that one disc moves relatively with and in an oscillatory manner opposite to that of the other disc. Furthermore, the oscillatory movement of each disc is limited by the prongs carried by each of said discs. The groove 19 is closed on the ends of side walls 20 and 21 by means of side or guard pieces 49 of pyramid-like construction. Said pieces have a slot in the middle portion for enclosing the ends of the discs to protect the operator from being injured.

In the modification shown in Fig. 10 the jagged or serrated end discs 50 and 51 are circularly moved to and fro by means of spindle 52 provided with a bevel gear 53. The latter gear is engaged with another gear 54 onto which are crank pins 55 and 56 for contact with the prongs of the discs 50 and 51. The center pin 57 acts as a pivot for the discs 50 and 51. The prongs of the discs are rocked by the crank pins 55 and 56 acting upon the prongs of the discs. The rotary drive shaft 52 imparts motion to the crank pins 55 and 56 by means of gears 53 and 54.

In both embodiments it will be noted that the axial plane of oscillation of the movable members is in alignment with the axis of the spindle, and that they oscillate relatively to each other.

Having thus described my invention, it will be seen that I have described a new method which consists in subjecting the skin where it adheres to the connective tissue to a beating action under simultaneous pulling of the skin, and pushing back the tissue whereby the skin is pulled off from the meat without cutting either the skin or meat. The improved apparatus consists of two members, one reciprocating in respect to the other, and having a notch between the parts of the members for the skin and adhering tissue to enter, and means for reciprocating one member in respect to the other, the members being arranged centrally of the means for reciprocating the same. The invention consists further of two superposed discs each having notches of large angular shape, pivoting means for the discs, and means arranged longitudinally with the meeting faces of the discs for reciprocating one disc with respect to the other. It will be noted that the serrations have dull side edges and that the under face portion is sharp when the plates are assembled together. Furthermore, the movement of the plates is so limited, as shown in Fig. 4, that the connective tissue if it does enter the notches of the plate is forced out because of the structure of the jagged edges forming the notches.

I do not wish to be limited to the embodiments shown in the drawings, since changes as to form, construction, and use may be made therein without departing from the spirit and scope of the invention, as defined in the appended claims.

I claim:

1. In apparatus for skinning animal carcasses, having a handle and base extending therefrom, the improvement comprising a pair of substantially circular plates centrally pivoted to the base to form a common axis of oscillation and having dull jagged ends in the periphery thereof for separating skin from the meat of the animal, said plates having a recessed portion forming prongs depending from the center thereof and being in alignment with the longitudinal axis of the base, linkage rocking means pivoted to the base in connection at one end with the prongs of one of the plates and having prongs at the other end, and eccentrically mounted cranking means in the handle having a cross pin in connection with the prongs of the second plate and the prongs of the linkage rocking means for simultaneously actuating both whereby, upon rotation of said means, a relatively opposite oscillating movement is imparted to the plates to push and jog the tissue intermediate the skin and flesh.

2. A device for skinning animals comprising a hollow handle with a groove transversely to the longitudinal axis of the handle, an extending base portion, a pair of substantially circular plates having dull jagged ends on the periphery thereof for separating the skin from the meat of the animal, said plates being pivotally mounted on the base and having a common axis of oscillation and a recessed portion forming prongs extending centrally therefrom, a linkage rocking member pivoted to the base and in connection at one end with the prongs of one of the plates and having prongs extending from its opposite end, slidable means mounted in the transverse groove of the handle in loose connection with the prongs of the linkage rocking member and of the other plate, rotary actuating means in the handle in connection with said slidable means whereby the latter causes simultaneous and relatively opposite oscillating movement of the plates around said common axis of oscillation, and a guard on each side of the base having a circumferential recess for the plates for protecting the hand of the operator of said device.

3. The method of skinning carcasses which consists in retaining the pell portion of the carcass under a state of tension away from the flesh portion of the carcass whereby the connective tissue intermediate the pell and flesh portion is distended, subjecting the connective tissue adjacent the underface of the pell portion to a rapid and simultaneous vibrating, jogging action in directions opposite each other, namely, against the connective tissue and the underface of the pell respectively, and laterally of the skin, the vibrating and jogging action being applied toward the underface of the pell while under tension to separate said pell from the connective tissue and obtain a smooth tissueless underface, without cutting either the pell or the flesh portion, the vibrating action against said flesh portion being performed at substantially right angles to the line of tension of the pell and connective tissue, and the thrust of the force of application of said vibrating action being diagonally of the line of tension on said pell and tissue.

WALTER PAUL WEZEL.